(12) United States Patent
Becker et al.

(10) Patent No.: US 8,949,193 B2
(45) Date of Patent: Feb. 3, 2015

(54) SYSTEM FOR ARCHIVING COMPOSITE FILES AND METHOD FOR OPERATING SUCH A SYSTEM

(75) Inventors: Detlef Becker, Möhrendorf (DE); Karlheinz Dorn, Kalchreuth (DE); Artur Pusztai, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1020 days.

(21) Appl. No.: 12/699,236

(22) Filed: Feb. 3, 2010

(65) Prior Publication Data

US 2011/0191301 A1    Aug. 4, 2011

(51) Int. Cl.
*G06F 7/76* (2006.01)
*G06F 17/30* (2006.01)
*G06F 17/00* (2006.01)

(52) U.S. Cl.
CPC .......... *G06F 17/00* (2013.01); *G06F 17/30073* (2013.01); *G06F 17/30091* (2013.01); *G06F 17/30318* (2013.01)
USPC ............ 707/667; 707/672; 707/673; 707/661

(58) Field of Classification Search
CPC .................... G06F 17/30318; G06F 17/30073; G06F 17/30091; G06F 19/321
USPC ........... 707/999.003, 999.204, 661, 667, 672, 707/736, 769; 711/161, 162
See application file for complete search history.

(56) References Cited

U.S. PATENT DOCUMENTS

| | | | |
|---|---|---|---|
| 7,853,621 B2 * | 12/2010 | Guo | 707/803 |
| 2008/0120140 A1 * | 5/2008 | Sirohey et al. | 705/3 |
| 2008/0301760 A1 * | 12/2008 | Lim | 726/1 |
| 2008/0319953 A1 * | 12/2008 | DeShan et al. | 707/3 |
| 2009/0063430 A1 * | 3/2009 | Anglin et al. | 707/3 |
| 2010/0070527 A1 * | 3/2010 | Chen | 707/772 |
| 2010/0138592 A1 * | 6/2010 | Cheon | 711/103 |
| 2010/0241651 A1 * | 9/2010 | Xiong et al. | 707/769 |
| 2011/0161450 A1 * | 6/2011 | Westin et al. | 709/206 |
| 2014/0181055 A1 * | 6/2014 | Rodriguez et al. | 707/694 |

OTHER PUBLICATIONS

"Building and Indexing a Distributed Multimedia Presentation Archive Using SMIL," J Hunter and S Little, Univ of Queensland, Australia, Research and Advanced Technology for Digital Libraries Lecture Notes in Computer Science vol. 2163, 2001, pp. 415-428.*

* cited by examiner

*Primary Examiner* — Bruce Moser
(74) *Attorney, Agent, or Firm* — Harness, Dickey & Pierce, P.L.C.

(57) ABSTRACT

A system for archiving composite files including metadata and payload data in a file system. In at least one embodiment, the system includes a database for storing, in particular exclusively, a first group of metadata of the archived composite files, corresponding to search criteria usable in a query; at least one information layer in the file system for storing a second group of metadata of the archived composite files in storage files, the second group in particular including the metadata of the first group and/or all metadata; and the archived composite files stored in the file system.

21 Claims, 2 Drawing Sheets

SYSTEM FOR ARCHIVING COMPOSITE FILES AND METHOD FOR OPERATING SUCH A SYSTEM

FIELD

At least one embodiment of the invention generally relates to a system for archiving composite files comprising metadata and payload data in a file system and a method for operating such a system.

BACKGROUND

Composite data files are known in many standards and used in a plurality of business domains. These data items comprise payload data, which is unique for each composite file, and metadata, where some metadata can be common across more than one composite file.

As a first example, medical images are typically stored in the well-known DICOM format, according to the DICOM standard. They contain the payload data, i.e. the actual image as pixel data and other attributes related to the image, and several metadata, in particular demographic data of the patient, study attributes and series attributes. All medical image composite files of one series will contain redundantly the same series attributes as metadata. If a study consists of more than one series, all files of that study will contain the same patient demographic attributes.

A second example is sound data, which can be stored in the also well-known mp3 format. They contain the payload data, for example a song as an mp3 encoded stream, and several metadata, like composer, album, interpret, publishing year etc.

Storing data items in composite files is very useful, since those data items can be copied from one place to another without breaking consistency: the files are self-consistent. However, for management of the files applications need a fast way to query or navigate the hierarchy of the composite files, like e.g. query all series of a particular patient, find all series of a study, find all songs by a particular composer published last year, etc. For better manageability, the typical approach is to use a database and store there in a suitable form the metadata. This way, applications can use the database for browsing and management purposes, and access the files only when the payload data is needed.

This approach has proven outcomes and is best practice since a long time now. However, it has some yet unsolved limitations and drawbacks.

First of all, the updating of metadata in the files is slow or (depending on the format) even impossible. When some metadata are changed by an application, those changes are first committed to the database, and then potentially—depending on the implementation—realised in the composite files. This second step is typically slow and very often not possible at all, for example, in the DICOM standard, where the whole file would need to be rewritten.

Thus, the composite files alone are not always reflecting the up-to-date metadata.

A further disadvantage is the slow rebuild of a database. The composite files must be parsed in order to extract the metadata from them, which is a slow process, especially, when may files are involved. This scenario can be of interest when attaching a new database to an existing file archive or in disaster recovery situations when the database was lost.

Disaster recoverability is, generally speaking, complex and costly. Backing up the composite files in a safe place is not sufficient, the database must be backed up also, because composite files might not be up to date and rebuilding of the database after a disaster might be slow (both explained above).

Additionally, a distributed system, which would provide access to the data from different geographical locations, is very complex and costly since the solution must consider both database and file system access.

A further disadvantage of the known systems is poor scalability, because the costs for large databases are high. These databases store the complete hierarchy information down to the filenames of the composite files.

Finally, applications which typically only need access to the composite files might deal with "out of date" information in the file system, so they always need to access the database to get the most up-to-date metadata for the composite files they use.

SUMMARY

At least one embodiment of the invention provides an archiving system for composite files allowing at least one of better scalability, lowering of costs, better disaster recovery, faster access and support for distributed data access.

As a solution, at least one embodiment of the invention proposes a system for archiving composite files comprising metadata and payload data in a file system, comprising:

a database for storing, in particular exclusively, a first group of metadata of the archived composite files, corresponding to search criteria usable in a query, at least one information layer in the file system for storing a second group of metadata of the archived composite files in storage files, the second group in particular comprising the metadata of the first group and/or all metadata, the archived composite files stored in the file system.

Thus, at least one embodiment of the invention proposes to introduce an additional information layer on the file system in which at least part of the metadata is stored. It is preferred that the database contains exclusively the metadata needed for queries and the information layer contains all metadata of the archived storage files, as in this manner the most advantages are gained, as described in detail below. However, there are conceivable cases in which a distribution of the metadata between the database and the information layer or a redundant storage of all metadata in the database may be sensible.

Using this additional information layer has a lot of advantages, as it is part of the file system and can be easily accessed. The metadata stored in the storage files is therefore accessible without database access.

If the database only contains the metadata of the first group, the scalability of the system is improved. The database can be kept very small, since it only contains metadata needed to perform queries. If a query is to be performed, the application searches the database. Access to the additional metadata in the information layer is possible since the search results can be used to identify the storage files containing the additional metadata. After that, for example, additional metadata can be read from the storage files and a list of search results can be displayed by the application, also containing metadata not present in the database itself.

Generally speaking, a software layer, i.e., an application, can access both the database and the file system including the information layer, wherein information retrieved from the database can be used to access particular storage files and use additional metadata stored therein. The storage of the additional metadata in the file system is cheaper than storing it in the database. In particular, instance-level attributes like filenames need not be stored in the database anymore.

If the metadata of the first group are also present in the information layer, many advantages result. First of all, a database rebuild can be done much faster now, since only the storage files must be parsed, but not the composite files, which can be left untouched. The storage files can, for example, be sorted by date and time and then be read one by one and imported into the database. The time needed is far less than scanning all the composite files, and is actually comparable to a restore of a backed up database.

If metadata is updated by an application, it is advantageously (if the updated metadata belong to the metadata stored in the database, especially the first group) updated in the database as well as in the storage files of the information layer. In this manner, if a database is rebuilt, the most up-to-date metadata can already be included from the storage files.

Another advantage of the information layer particularly containing all the metadata is the improved access performance to updated metadata. As already described, when an application is updating at least some metadata, it will preferably consistently update the database and the corresponding storage files, leaving the composite files untouched. In a preferred embodiment of the invention, the storage files are named such that the storage files containing the metadata of given composite files are derivable from the given composite files. Thus, when an application reads a composite file, it is able to compute the at least one corresponding storage file from the metadata and read this file in addition in order to get the most up-to-date metadata. No database access is needed for this purpose.

If the storage files contain at least the metadata stored in the database, it is sufficient to back up the file system, i.e. the composite files and the storage files, to be able to recover the system in case of a disaster. The database can, as described above, be easily and fast rebuilt from the metadata of the second group. The information layer only comprises a small portion of the total data amount, and the same back-up technology as used for the composite files can be used to back-up the storage files, so that the costs and the complexity of the solution are kept small.

It should be noted that the described advantages relating to the database also result in a greater independency from database schemes and DBMS vendors. For example, a simple data migration from one database to another is possible.

Preferably, the information layer is defined in the XML standard. XML is well suited for the realisation of such a system, in particular in combination with the directory structure of the storage files described below.

In at least one example embodiment composite files are grouped into file groups according to common metadata and at least one storage file for every file group is provided. As already noted in the introduction, often composite files share particular attributes, e.g. songs having the same composer or being from the same album. To define a sorting criterion for the storage files, these common metadata can be used. Preferably, the common metadata of a file group are stored only once in each storage file, so that redundant data are avoided. Additionally, in a first embodiment, the storage file can comprise, in particular block by block, the other metadata of the composite files of the file group together with the corresponding filenames.

The described concept can also be realised iteratively, meaning that a file group of a first abstraction level can again contain subgroups of composite files sharing common metadata. These composite files can form file subgroups of another, lower abstraction level. In this case, preferably storage files corresponding to a first abstraction level can contain references to the file subgroups belonging to this file group in addition to the common metadata, wherein only in the lowest abstraction level storage files contain the individual metadata alongside the filenames of the composite files. In particular, each storage file of a lower abstraction level contains a reference to the higher abstraction level file group to which it belongs. If such a hierarchic structure is used, it is of course possible that a file group and/or a file subgroup contains only one composite file.

As an example, consider DICOM files as composite files, using a Study Root information model, according to which the patient demographic data are part of the Study Information Entity. Now, knowing all composite files of a study share some common metadata and that a study may contain one or more series, whose composite files again share some common metadata, two kinds of storage files can be considered, namely study storage files and series storage files. Different directories may be provided for these two kinds. The study storage files contain patient demographic metadata and study-related metadata common for all DICOM instances (composite files) being part of a series of this study. In particular, the study storage file will contain a list of series identifiers as a reference to the series of the study.

A series storage file contains series-related metadata common for all instances (composite files) of that series as well as a list of instance-related metadata on a per-instance base. In particular, this file will contain a study identifier of the study which this series is part of as well as a list of all filenames of the composite files being part of the series.

Preferably, the storage files are evenly distributed to a plurality of directories of the file system using a hashing algorithm. Due to the fact that most file systems deliver poor performance when the number of files in one directory exceeds a certain limit, a hashing algorithm can be used to distribute the storage files evenly across a number of subdirectories. The maximal number of directories used can be configured when the system is deployed. If, for example, the system is supposed to archive data of an enterprise generating about 1000000 file groups a year, and assuming the information is intended to be stored for 30 years, and further assuming the file system delivers good performance for up to 30000 files per directory, the maximum number of directories computes to 1000.

At least one embodiment of the inventive system also provides support for distributed data access. In an advantageous embodiment, a plurality of databases situated at different geographical location and/or at least one application accessing the file system with the information layer and the composite files are provided. Since for the sharing of file systems standard IT solutions exist and are used extensively, it makes sense to use the same technology for the storage files. More than one database can easily be attached to the file system or be built from the information in the information layer. As already discussed above, applications can use the file system without the need to query a database for up-to-date metadata.

Preferably, if a storage file and/or a composite file is updated at one location, a message containing the changed files is sent to all other locations and the databases at the other locations are updated. Assuming local data management systems are used, each time an update on metadata, in particular one or more storage files, is performed, the local data management system at the location of the change sends a small message to the other local data management systems, for example using an enterprise bus. These messages point to the changed storage file(s). The receiving local data management systems then re-import the changed storage file(s) to get their local database up to date.

Generally speaking, as already hinted on above and also valid on distributed systems as just described, databases attached to the file system can have different schemas, for example a database containing a large part of the metadata for data mining and others for straight-forward navigation with minimal details, and even different vendors—they are truly independent and exchange data through the storage files of the information layer, which have a well-defined schema.

In addition to the system, at least one embodiment of the present invention also proposes a method for operating a system for archiving composite files comprising metadata and payload data in a file system, wherein:

a first group of metadata of the archived composite files, corresponding to search criteria usable in a query, are stored in a database; and a second group of metadata of the archived composite files, the second group in particular comprising the metadata of the first group and/or all metadata, are stored in storage files in at least one information layer in the file system.

Obviously, the method allows for the data structure of the system of at least one embodiment of the invention to be generated and therefore results in the same advantages as the system itself. In particular, all embodiments described above with respect to the system can be transferred correspondingly to the method.

BRIEF DESCRIPTION OF THE DRAWINGS

Further advantages and details of the present invention can be seen from the following description of particular embodiments of the invention, taken in conjunction with the drawings, in which.

DETAILED DESCRIPTION OF THE EXAMPLE EMBODIMENTS

Figure 1:
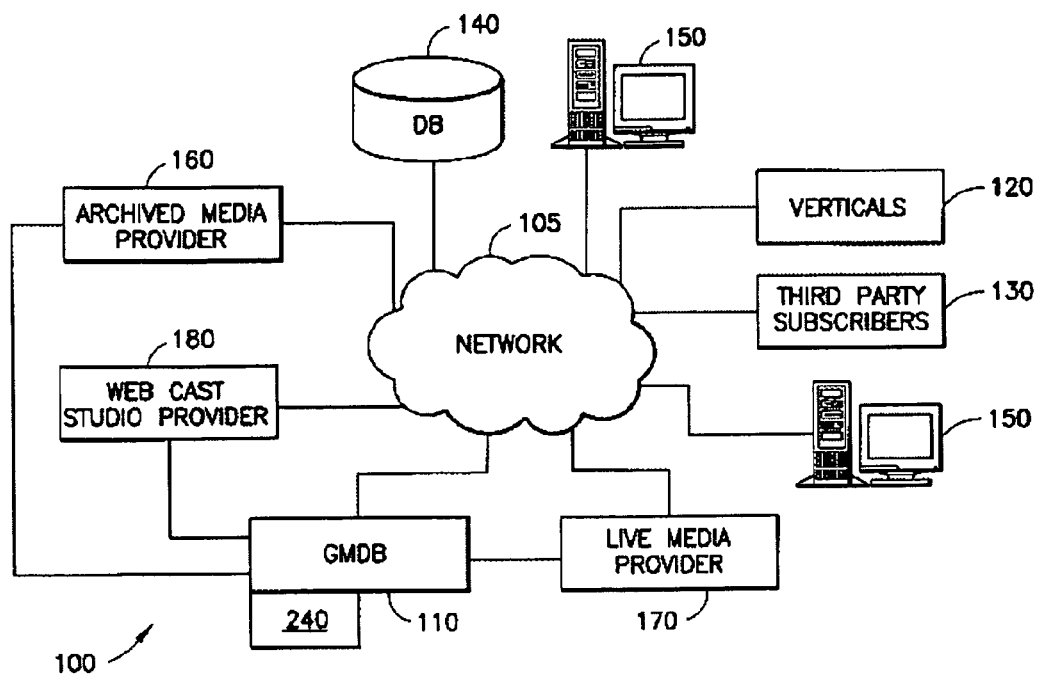
FIG. 1 is a schematic diagram of an archiving system according to an embodiment of the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Although in the embodiments described below medical images stored in the DICOM format are discussed, the principle of the invention can also be used in other applications, for example in an archiving system for music.

As known from former archiving systems, an archiving system 1 depicted schematically in FIG. 1 comprises a file system 2 in which the composite files 3 are stored, as well as a database 4 used for queries by an application 5 in a software layer 6. According to an embodiment of the invention, the archiving system 1 additionally has an information layer 7 containing storage files 8. These storage files 8 contain all metadata of the archived composite files 3. The database, however, only contains a first group of metadata of the archived composite files 3, corresponding to search criteria usable in a query.

The contents of the storage files 8 and the structure of the information layer 7 is discussed first, wherein in this embodiment the XML standard is used.

Figure 2:
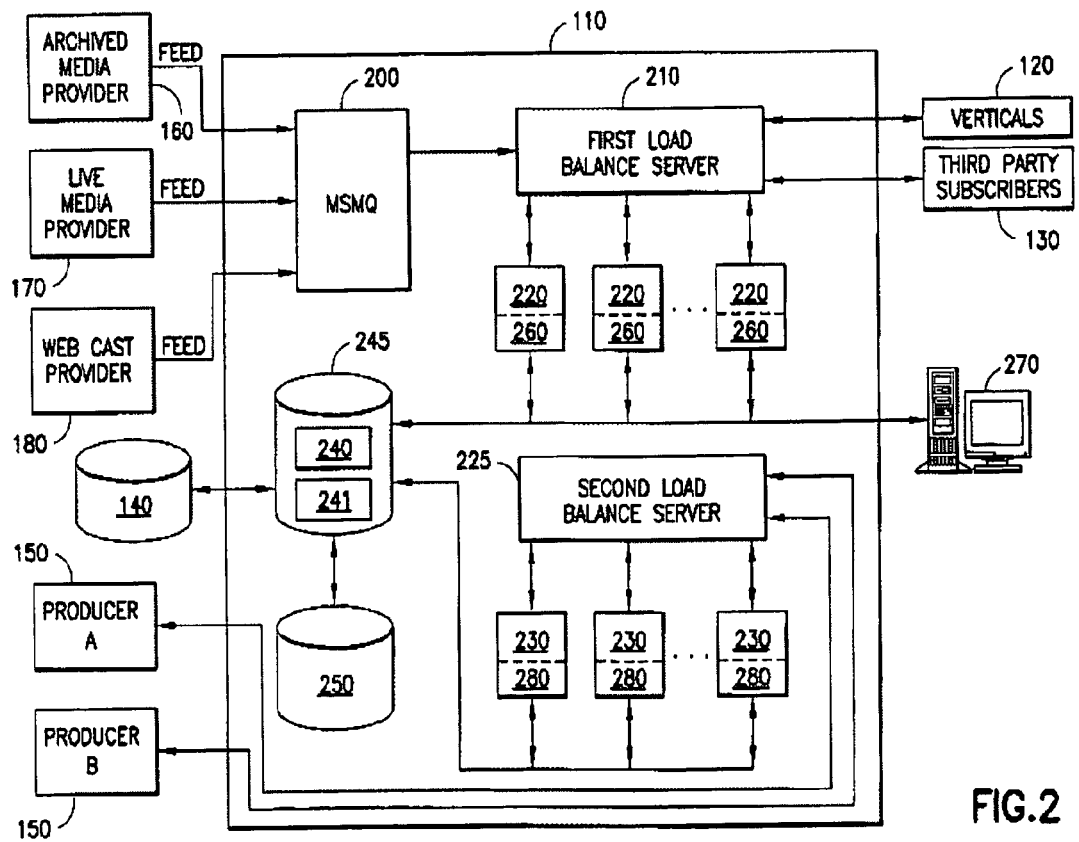
FIG. 2 is a schematic diagram showing abstraction levels and directory structure in an information layer.

In the archiving system 1, two abstraction levels 9, 10 are used for structuring the metadata stored in the storage files 8, as shown in the diagram of FIG. 2.

The archiving system 1 according to an embodiment of the invention is used to archive and manage medical images stored as composite files in the DICOM format. The study root information model is used, wherein the patient demographic metadata forms part of the study information entity, and each study comprises one or more composite files belonging to one or more series of the study. The composite files belonging to a study share common study-related metadata, and the composite files belonging to a series share common series-related metadata.

Accordingly, a study abstraction level 9 and a lower, series abstraction level 10 are used. The composite files 3 are divided into file groups of composite files belonging to particular studies, which file groups contain file subgroups for all series belonging to a study. Thus, there are two kinds of storage files 8, namely study storage files 8a and series storage files 8b.

The study storage files 8a contain patient and study-related metadata common for all DICOM composite files 3 being part of any series of this study. The filename contains the study identifier (study instance UID). In particular, a study storage file 8a will contain a list of series identifiers (series instance UID) of those series being part of the study.

The series storage files 8b contain series-related metadata common for all composite files 3 of that series, as well as a list of composite-file related metadata on a per-composite-file base, part of which is the filename of the composite file. In particular, the series storage files 8b also contain the study identifier (study instance UID) of the study the series belongs to. The filename contains the series identifier (series instance UID).

As can be seen from FIG. 2, for the storage of the storage file a root directory 11 and two subdirectories 12, 13 named "studies" and "series" have been defined, in a similar way as two tables in a database would be defined. Each subdirectory 12, 13 contains an .xsd-file of the XML standard, defining the structure of the content of the storage files 8a, 8b, respectively. The storage files 8a and 8b are arranged in numbered subdirectories 14 of the directories 12, 13, indicated by "<nnnn>".

This is because, to maintain a good performance of the file system 2, a directory should not contain more than a maximum number of files, for example, 30000. The archiving system 1 uses a hashing algorithm in order to distribute the study storage files 8a and the series storage files 8b evenly across the subdirectories 14. The number of subdirectories is chosen when the system is deployed such that the maximum of the number of composite files 3 to be stored is estimated and used together with the maximum number of files per directory to compute the number of subdirectories 14, which can, for example, be 1000, if 30000000 series of composite files 3 should be archived at most.

Given a study identifier or a series identifier (which are both UIDs), the hashing algorithm will generate a number between 0 and the number of subdirectories 14, so that for a given DICOM UID always the same number is generated, and the numbers generated for a large number of DICOM UIDs are evenly spread. This way, the study storage files 8a and the series storage files 8b will be stored evenly across the subdirectories 14 of the directories 12 and 13.

Sometimes, metadata is updated, for example when correcting mistakes or the demographic data of a patient change. Whenever such an update is effected, for example by using an application 5, the database 4 and the storage files 8 are both updated consistently, leaving the composite files 3 untouched.

If, for example, a user wants to find a particular image (and hence a particular composite file 3), a query could be formulated, using for example search attributes such as patient name or examined body part. The application 5 then queries the database 4 and gets at least one study identifier (study instance UID) and/or at least one series identifier (series instance UID). To display lists or the like containing metadata of the composite files 3 of these series/studies which are not used as search criteria, the application 5 may now access the information layer 7 in the file system 2 and retrieve this information as well as the corresponding file names of the composite files 3 from the storage files 8.

Some applications 5 only need access to the composite files 3, i.e. directly read such a file. As the storage files 8 are named as described above, their filenames can easily be computed from the metadata in the composite files, here in particular from the UIDs of the study and the series. Thus, the storage files 8 containing the up-to-date metadata can additionally be read by such an application 5 to get the most up-to-date metadata. The database 4 need not be accessed.

From the storage files 8, the database 4 can easily be rebuilt, since only the series storage files 8b have to be listed across all subdirectories 14, possibly sorted by date and time, and then read one by one and imported into the database 4. As they are read, the study storage files 8a can be read and imported if the database 4 does not yet contain information about that study. This process is faster than parsing the composite files 3.

For disaster recovery, the file system 2 is backed up as a whole, i.e. the composite files 3 and the storage files 8 are copied to a proper location (in particular a geographically different location). In case of a disaster, the database 4 can easily be rebuilt as described above.

It should be noted generally that different databases 4 can access and use the file system 2. The schemes of these databases 4 can be different, as they are independent and exchange data through the storage files 8, which have a well-defined schema.

Figure 3:
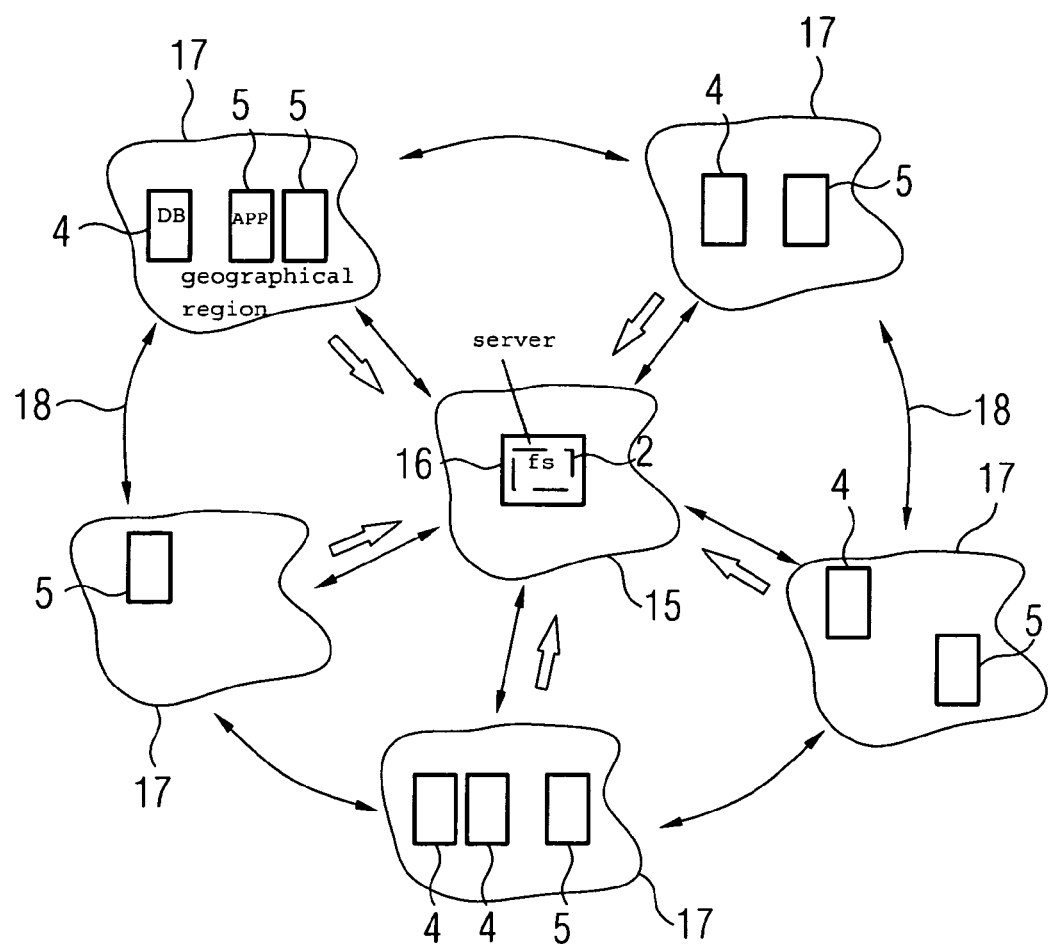
FIG. 3 is a schematic diagram of a distributed system.

The use of an embodiment of the invention in distributed systems is shown in FIG. 3. The file system 2 can be hosted at one geographical location 15, for example on a server 16. At several other geographical locations 17, databases 4 and/or applications 5 can access the file system 2.

If an update on the metadata is performed, i.e. database 4 contents locally and storage files 8 at location 15 are changed from one location 17, the local data management system (not shown) sends a message containing the changed storage file(s) 8 using an enterprise bus indicated at 18 to the other locations 17. There, the local data management systems receiving the message can re-import the changed storage file(s) 8 so that the databases 4 all stay up to date.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer device for archiving composite files in a file system, the composite files including metadata and payload data and the computer device comprising:
   a non-transitory memory including a database configured to exclusively store a first group of metadata of the archived composite files, the first group of metadata corresponding to search criteria usable in a query, the first group of metadata including only a subset of the metadata included in the composite files, and the subset of the metadata including less than all metadata included in the composite files;
   at least one information layer in the file system configured to store a second group of metadata of the archived composite files in storage files, the second group of metadata including at least the metadata of the first group; and
   the archived composite files stored in the file system; wherein
   the computer device archives the composite files in the file system, and
   the composite files include the metadata and the payload data.

2. The computer device of claim 1, wherein the information layer is defined in an XML standard.

3. The computer device of claim 2, wherein composite files are grouped into file groups according to common metadata and at least one storage file for every file group is provided.

4. The computer device of claim 1, wherein the composite files are grouped into file groups according to common metadata and at least one storage file for every file group is provided.

5. The computer device of claim 1, wherein the storage files are evenly distributed to a plurality of directories of the file system using a hashing algorithm.

6. The computer device of claim 1, wherein the storage files are named such that the storage files containing the metadata of given composite files are derivable from the given composite files.

7. The computer device of claim 1, wherein at least one of a plurality of databases situated at different geographical locations and at least one application accessing the file system with the information layer and the composite files are provided.

8. The computer device of claim 7, wherein, if at least one of a storage file and a composite file is updated at one location, a message containing the changed files is sent to all other locations and the databases at the other locations are updated.

9. The computer device of claim 1, wherein the second group of metadata includes at least the metadata of the first group and additional metadata.

10. The computer device of claim 1, wherein the subset of the metadata includes only metadata needed for database queries.

11. A method for operating a system for archiving composite files in a file system, the composite files including metadata and payload data and the method comprising:

archiving the composite files in the file system;

storing, exclusively in a database, a first group of metadata of the archived composite files, the first group of metadata corresponding to search criteria usable in a query, and the first group of metadata including only a subset of the metadata included in the composite files, and the subset of the metadata including less than all metadata included in the composite files; and storing a second group of metadata of the archived composite files, the second group of metadata including at least the metadata of the first group, in storage files in at least one information layer in the file system; wherein the composite files include the metadata and the payload data.

12. The method according to claim 11, wherein the composite files are grouped into file groups according to common metadata and at least one storage file for every file group is provided.

13. The method according to claim 12, wherein the storage files are evenly distributed to a plurality of directories of the file system using a hashing algorithm.

14. The method according to claim 12, wherein a plurality of databases situated at different geographical locations or at least one application accessing the file system with the information layer and the composite files are provided and, if at least one of a storage file and a composite file is updated at one location, a message containing the changed files is sent to all other locations and the databases at the other locations are updated.

15. The method according to claim 12, wherein at least one of a plurality of databases situated at different geographical locations and at least one application accessing the file system with the information layer and the composite files are provided and, if at least one of a storage file and a composite file is updated at one location, a message containing the changed files is sent to all other locations and the databases at the other locations are updated.

16. The method according to claim 11, wherein the storage files are evenly distributed to a plurality of directories of the file system using a hashing algorithm.

17. The method according to claim 11, wherein the storage files are named such that the storage files containing the metadata of given composite files are derivable from the given composite files.

18. The method according to claim 11, wherein at least one of a plurality of databases situated at different geographical locations and at least one application accessing the file system with the information layer and the composite files are provided and, if at least one of a storage file and a composite file is updated at one location, a message containing the changed files is sent to all other locations and the databases at the other locations are updated.

19. The method of claim 11, wherein the second group of metadata includes at least the metadata of the first group and additional metadata.

20. The method of claim 11, wherein the subset of the metadata includes only metadata needed for database queries.

21. A non-transitory computer readable medium including program segments for, when executed on a computer device, causing the computer device to implement the method of claim 11.

* * * * *